US010796166B2

(12) United States Patent
Anami et al.

(10) Patent No.: US 10,796,166 B2
(45) Date of Patent: Oct. 6, 2020

(54) INFORMATION PROCESSING FOR AGGREGATING SENSOR INFORMATION ABOUT PERSONS ENTERING AND EXITING A VENUE

(71) Applicant: NEC Corporation, Tokyo (JP)

(72) Inventors: Shinichi Anami, Tokyo (JP); Yushi Niwa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 46 days.

(21) Appl. No.: 16/086,794

(22) PCT Filed: Mar. 23, 2017

(86) PCT No.: PCT/JP2017/011653
§ 371 (c)(1),
(2) Date: Sep. 20, 2018

(87) PCT Pub. No.: WO2017/164287
PCT Pub. Date: Sep. 28, 2017

(65) Prior Publication Data
US 2019/0122051 A1 Apr. 25, 2019

(30) Foreign Application Priority Data
Mar. 23, 2016 (JP) ................. 2016-059143

(51) Int. Cl.
*G06K 9/00* (2006.01)
*H04N 5/232* (2006.01)
(Continued)

(52) U.S. Cl.
CPC ..... *G06K 9/00778* (2013.01); *G06K 9/00255* (2013.01); *G06K 9/00288* (2013.01);
(Continued)

(58) Field of Classification Search
CPC .......... G06K 9/00778; G06K 9/00255; G06K 9/00288; G08B 25/04; H04N 5/232;
(Continued)

(56) References Cited

U.S. PATENT DOCUMENTS

2004/0189801 A1 9/2004 Chang
2008/0211916 A1* 9/2008 Ono ................. G08B 13/19608
348/164
2017/0147866 A1 5/2017 Tokui et al.

FOREIGN PATENT DOCUMENTS

JP 2007-158421 A 6/2007
JP 2008-252863 A 10/2008
(Continued)

OTHER PUBLICATIONS

International Search Report of PCT/JP2017/011653 dated Jun. 20, 2017.
(Continued)

*Primary Examiner* — Christopher Wait
(74) *Attorney, Agent, or Firm* — Sughrue Mion, PLLC

(57) ABSTRACT

An information processing system includes: a first detection device that acquires information about a first domain; a plurality of second detection devices, each of which acquires information about a domain included in the first domain; a selection unit that selects at least one second detection device from the plurality of second detection devices based on a state of a target obtained from the acquired information about the first domain; and an aggregating unit that aggregates the information about the domain acquired by the selected at least one second detection device.

9 Claims, 15 Drawing Sheets

(51) Int. Cl.
  *H04N 7/18* (2006.01)
  *G08B 25/04* (2006.01)
  *H04N 5/247* (2006.01)
(52) U.S. Cl.
  CPC ............ *G08B 25/04* (2013.01); *H04N 5/232* (2013.01); *H04N 7/18* (2013.01); *H04N 7/181* (2013.01); *H04N 5/247* (2013.01)
(58) Field of Classification Search
  CPC .......... H04N 7/18; H04N 7/181; H04N 5/247; H04N 5/23299
  See application file for complete search history.

(56) References Cited

FOREIGN PATENT DOCUMENTS

| | | |
|---|---|---|
| JP | 2013-157675 A | 8/2013 |
| JP | 2013-168757 A | 8/2013 |
| JP | 2014-170431 A | 9/2014 |
| WO | 2006/018883 A1 | 2/2006 |
| WO | 2014/083910 A1 | 6/2014 |
| WO | 2015/186519 A1 | 12/2015 |

OTHER PUBLICATIONS

Communication dated Jul. 24, 2020, issued by the U.S. Patent and Trademark Office in U.S. Appl. No. 16/438,746.

* cited by examiner

FIG. 4

TBL1

| SECOND SENSING DEVICE | SENSING INFORMATION ACQUIRABLE AREA |
|---|---|
| SECOND SENSING DEVICE 20a | AREA Ra |
| SECOND SENSING DEVICE 20b | AREA Rb |
| SECOND SENSING DEVICE 20c | AREA Rc |
| SECOND SENSING DEVICE 20d | AREA Rd |
| SECOND SENSING DEVICE 20e | AREA Re |
| SECOND SENSING DEVICE 20f | AREA Rf |
| SECOND SENSING DEVICE 20g | AREA Rg |
| SECOND SENSING DEVICE 20h | AREA Rh |

FIG. 5

TBL2

| SECOND SENSING DEVICE | INSTALLATION POSITION |
|---|---|
| SECOND SENSING DEVICE 20a | $(x_a, y_a)$ |
| SECOND SENSING DEVICE 20b | $(x_b, y_b)$ |
| SECOND SENSING DEVICE 20c | $(x_c, y_c)$ |
| SECOND SENSING DEVICE 20d | $(x_d, y_d)$ |
| SECOND SENSING DEVICE 20e | $(x_e, y_e)$ |
| SECOND SENSING DEVICE 20f | $(x_f, y_f)$ |
| SECOND SENSING DEVICE 20g | $(x_g, y_g)$ |
| SECOND SENSING DEVICE 20h | $(x_h, y_h)$ |

FIG. 6

| AUTHENTICATION TARGET | SENSING INFORMATION |
|---|---|
| AUTHENTICATION TARGET A | SENSING INFORMATION A |
| AUTHENTICATION TARGET B | SENSING INFORMATION B |
| AUTHENTICATION TARGET C | SENSING INFORMATION C |
| AUTHENTICATION TARGET D | SENSING INFORMATION D |
| AUTHENTICATION TARGET E | SENSING INFORMATION E |
| AUTHENTICATION TARGET F | SENSING INFORMATION F |
| AUTHENTICATION TARGET G | SENSING INFORMATION G |
| AUTHENTICATION TARGET H | SENSING INFORMATION H |
| AUTHENTICATION TARGET I | SENSING INFORMATION I |
| AUTHENTICATION TARGET J | SENSING INFORMATION J |
| AUTHENTICATION TARGET K | SENSING INFORMATION K |
| AUTHENTICATION TARGET L | SENSING INFORMATION L |

TBL3

INFORMATION PROCESSING FOR AGGREGATING SENSOR INFORMATION ABOUT PERSONS ENTERING AND EXITING A VENUE

CROSS REFERENCE TO RELATED APPLICATIONS

This application is a National Stage of International Application No. PCT/JP2017/011653 filed Mar. 23, 2017, claiming priority based on Japanese Patent Application No. 2016-059143 filed Mar. 23, 2016, the disclosure of which is incorporated herein in its entirety.

TECHNICAL FIELD

The present invention relates to an information processing system, an information processing method, and a program.

BACKGROUND ART

Face authentication systems are sometimes used as a means for confirming persons entering and exiting a venue such as a theme park or an event venue.

Patent Document 1 describes, as a related technique, a technique that controls a gaze camera based on position information of a monitored target imaged from above by an overhead camera.

PRIOR ART DOCUMENT

Patent Document

[Patent Document 1] Japanese Unexamined Patent Application, First Publication No. 2013-168757

DISCLOSURE OF THE INVENTION

Problem to be Solved by the Invention

When confirming a large number of persons entering and exiting a venue such as a theme park or an event venue, there is a possibility that the persons entering and exiting the venue may experience dissatisfaction due to congestion and the like if authentication processing is slow.

Therefore, there has been demand for a technique capable of rapidly authenticating an authentication target existing in a predetermined area.

An exemplary object of the present invention is to provide an information processing system, an information processing method, and a program capable of solving the above problem.

Means for Solving the Problem

An information processing system according to a first exemplary aspect of the present invention includes: a first detection device that acquires information about a first domain; a plurality of second detection devices, each of which acquires information about a domain included in the first domain; a selection unit that selects at least one second detection device from the plurality of second detection devices based on a state of a target obtained from the acquired information about the first domain; and an aggregating unit that aggregates the information about the domain acquired by the selected at least one second detection device.

An information processing method according to a second exemplary aspect of the present invention includes: acquiring information about a first domain; selecting, based on a state of a target obtained from the acquired information about the first domain, at least one detection device from a plurality of detection devices, each of which acquires information about a domain included in the first domain; and aggregating the information about the domain acquired by the selected at least one detection device.

A program according to a third exemplary aspect of the present invention causes a computer to execute: acquiring information about a first domain; selecting, based on a state of a target obtained from the acquired information about the first domain, at least one detection device from a plurality of detection devices, each of which acquires information about a domain included in the first domain; and aggregating the information about the domain acquired by the selected at least one detection device.

Effects of the Invention

According to an exemplary embodiment of the present invention, it is possible to quickly authenticate an authentication target existing in a predetermined area.

BRIEF DESCRIPTION OF THE DRAWINGS

FIG. 4 is a diagram showing a first data table in the first exemplary embodiment of the present invention.

FIG. 5 is a diagram showing a second data table in the first exemplary embodiment of the present invention.

FIG. 6 is a diagram showing a third data table in the first exemplary embodiment of the present invention.

EMBODIMENTS FOR CARRYING OUT THE INVENTION

First Exemplary Embodiment

Hereunder, exemplary embodiments will be described in detail with reference to the drawings.

The configuration of an authentication system 1 (information processing system) according to a first exemplary embodiment of the present invention will be described.

Figure 1:
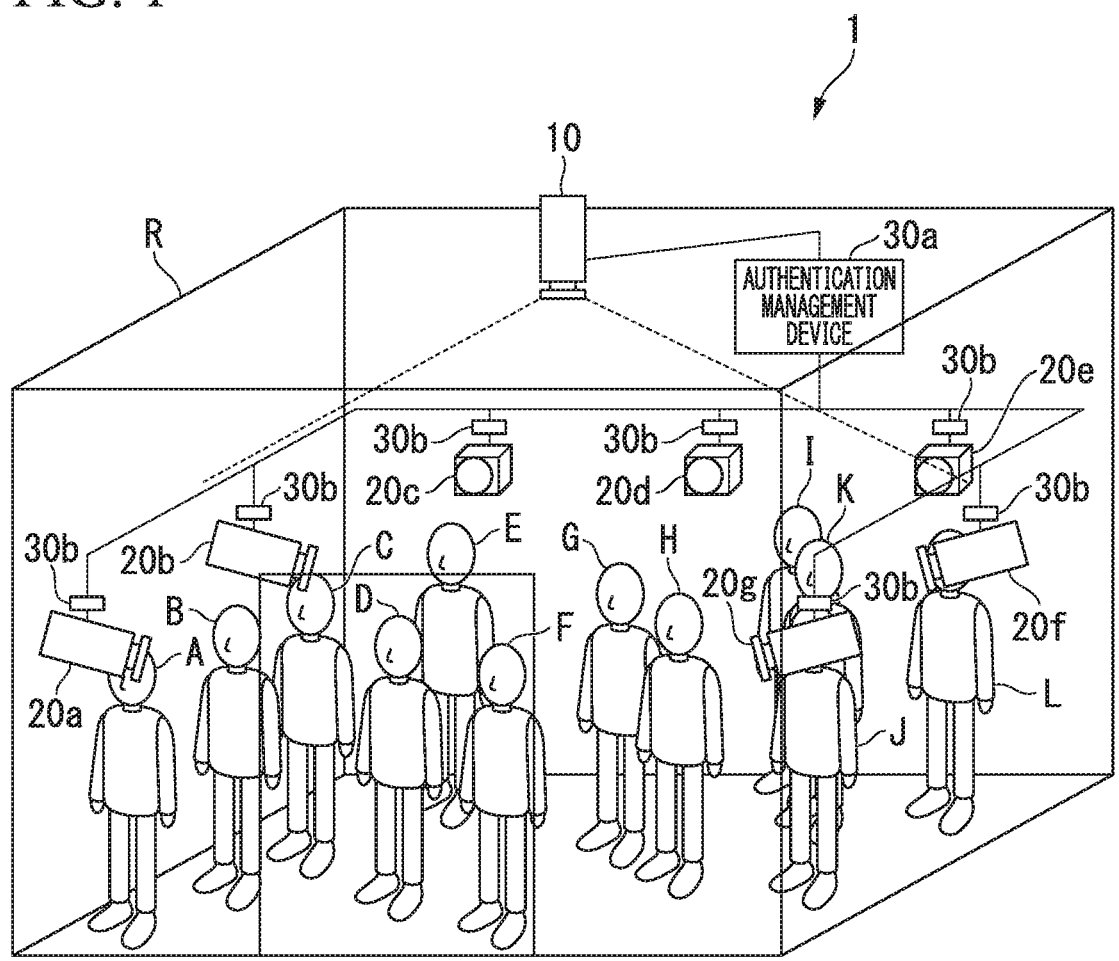
FIG. 1 is a diagram showing the configuration of an authentication system according to a first exemplary embodiment of the present invention.

As shown in FIG. 1, the authentication system 1 according to the first exemplary embodiment of the present invention includes a first sensing device 10 (first detection device), second sensing devices 20a, 20b, 20c, 20d, 20e, 20f, and 20g (second detection devices), and an authentication processing device 30.

The second sensing devices 20a to 20g are collectively referred to as second sensing devices 20.

A predetermined area (first domain) indicated by reference symbol R (referred to as the "predetermined area R" below) is shown in FIG. 1.

Figure 2:
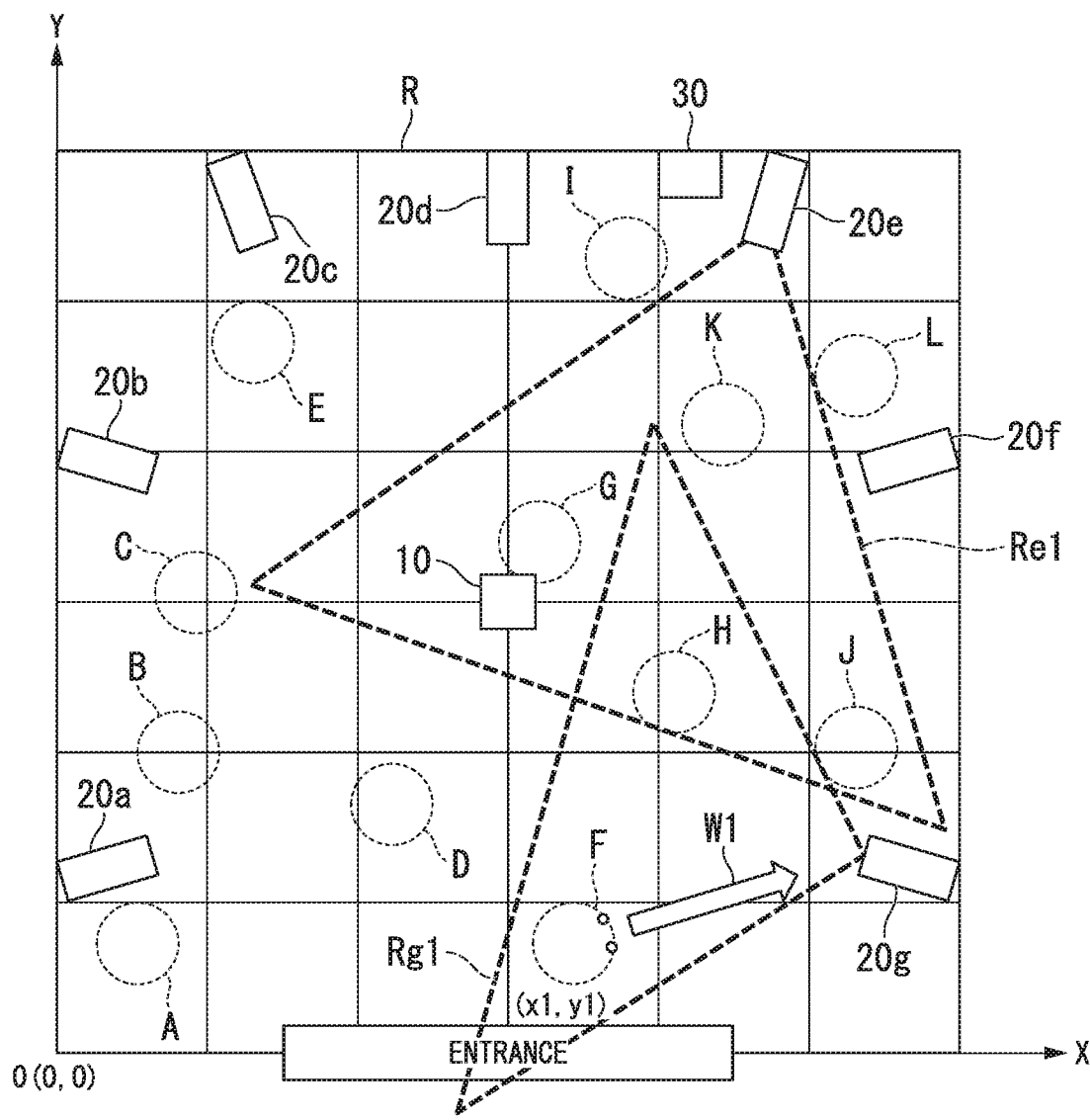
FIG. 2 is a top view of a predetermined area according to the first exemplary embodiment of the present invention.

As shown in FIG. 2, the first sensing device 10 is provided in a position that enables an overhead view of authentication targets A, B, C, D, E, F, G, H, I, J, K, and L (referred to as the "authentication targets A to L" below) in the predetermined area R.

The first sensing device 10 measures the state of one or more authentication targets existing in the predetermined area R. The state of an authentication target may represent, for example, the position of the authentication target existing in the predetermined area R, or the direction of the authentication target.

Specifically, the first sensing device 10 is an imaging device for example. If an authentication target is a person, the first sensing device 10 acquires a first image that includes the position of the person in the predetermined area R and the direction of the face of the person, by imaging the person in the predetermined area R from above.

The second sensing devices 20 are provided at the periphery of the predetermined area R in positions that enable sensing information about an authentication target existing in the predetermined area R to be acquired.

Specifically, the second sensing devices 20 are each provided in positions that are determined based on their own performance with respect to acquiring sensing information about the authentication target, the performance of the other second sensing devices 20 with respect to acquiring sensing information about the authentication target, and the installation positions of the other second sensing devices 20. If the second sensing devices 20 are imaging devices, for example, the performance with respect to acquiring sensing information refers to the size of the area in which sensing information can be acquired (second domain), which is determined according to the angle of view as shown for the second sensing device 20e in FIG. 2 (area Re1).

One or more second sensing devices 20 are selected from among all of the second sensing devices 20 based on the state of the authentication target acquired by the first sensing device 10. The selected second sensing device 20 acquires sensing information about one or more authentication targets existing in the predetermined area R. The sensing information represents, for example, the shape of the authentication target, the color of the authentication target, and the like, and is information that enables identification of the authentication target.

Specifically, the second sensing device 20 is an imaging device for example. If the authentication target is a person, the second sensing device 20 that is capable of acquiring sensing information with respect to the person thereof is selected based on the position of the person in the predetermined area R and the direction of the face of the person indicated by the first image captured by the first sensing device 10. Each of the selected second sensing devices 20 respectively acquire a second image that includes the face of the person representing the imaging target and the color of the clothing worn by the person thereof.

For example, if the predetermined area R is not very large and second sensing devices 20 are installed at the four corners of the predetermined area R and the like, the second sensing device 20 positioned in a direction in which the face of the target is facing may be selected.

Figure 3:
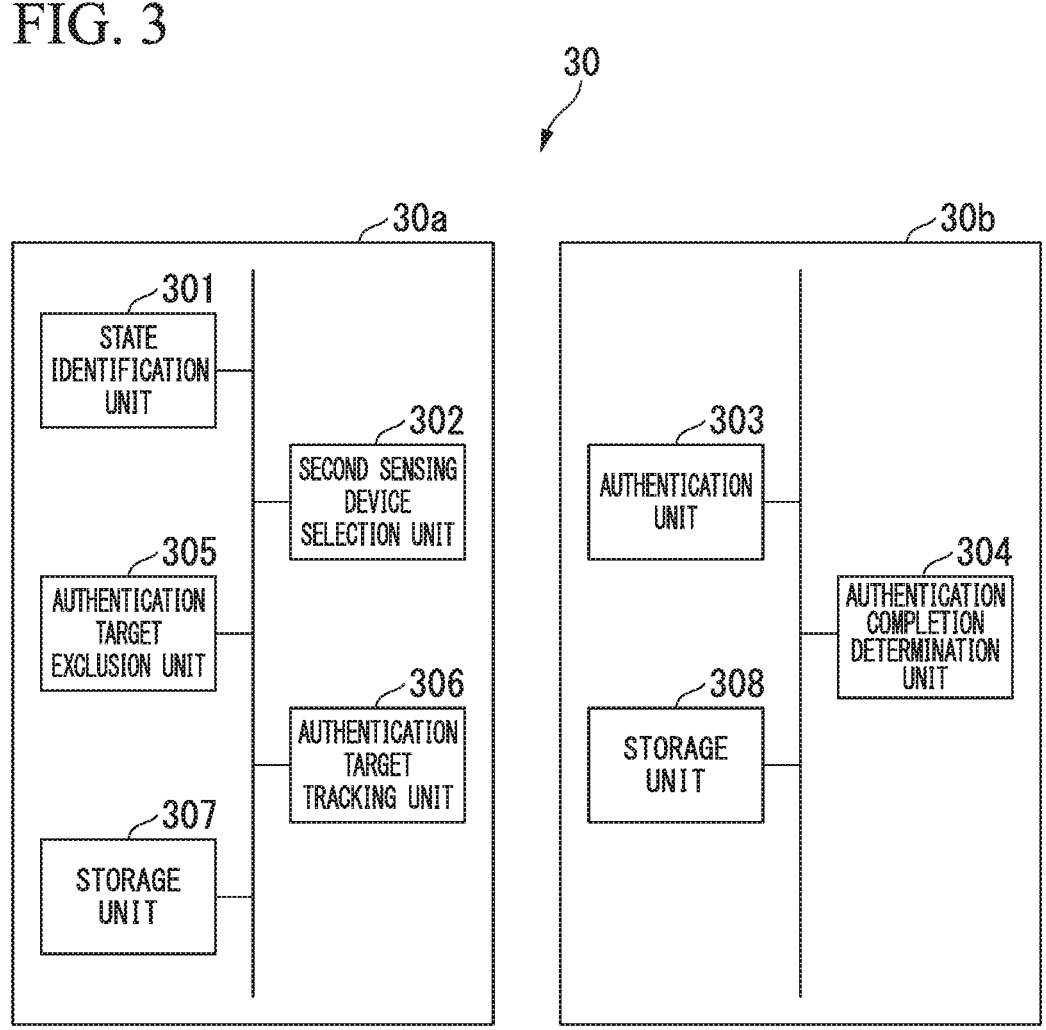
FIG. 3 is a diagram showing the configuration of an authentication processing device according to the first exemplary embodiment of the present invention.

As shown in FIG. 3, the authentication processing device 30 includes an authentication management device 30a and an authentication device 30b.

The authentication management device 30a includes a state identification unit 301, a second sensing device selection unit (selection unit) 302, an authentication target exclusion unit 305, an authentication target tracking unit 306, and a storage unit 307.

The authentication device 30b includes an authentication unit (aggregating unit) 303, an authentication completion determination unit 304, and a storage unit 308. An authentication device 30b is provided in each of the second sensing devices 20.

The state identification unit 301 identifies the state of each of the authentication targets measured by the first sensing device 10.

For example, the state identification unit 301 analyzes the first image captured by the first sensing device 10 using a technique described in PCT International Publication No. WO 2015/186519. The state identification unit 301 identifies the position of each of the authentication targets in the predetermined R and the direction of the face of each of the authentication targets, by analyzing the first image.

The second sensing device selection unit 302 selects the second sensing device 20 based on the state of each of the authentication targets identified by the state identification unit 301.

The second sensing device selection unit 302 selects the second sensing device 20 based on the state of a target in which authentication processing is not complete. A target in which authentication is not complete refers to an authentication target that remains after the authentication target exclusion unit 305 described below has excluded the authentication targets in which authentication is determined to be complete, from the authentication targets.

The authentication unit 303 performs authentication processing using the sensing information about each of the authentication targets acquired by the selected second sensing device 20.

The authentication completion determination unit 304 determines whether or not authentication of an authentication target is complete.

The authentication target exclusion unit 305 excludes a target in which authentication is determined to be complete, from the targets of the next authentication processing.

The authentication target tracking unit 306, for example, tracks an authentication target using a technique described in PCT International Publication No. WO 2014/083910.

The storage unit 307 stores various pieces of information necessary for the processing performed by the authentication management device 30a.

For example, the storage unit 307 stores a first data table TBL1 as shown in FIG. 4. The first data table TBL1 indicates a correspondence relationship between each of the second sensing devices 20 and the area in which each of the second sensing devices 20 are capable of acquiring sensing information. The information in the first data table TBL1 and that is stored by the storage unit 307, about the area in which sensing information can be acquired may be defined by a set of coordinate points indicating an outline of the area thereof. The information in the first data table TBL1 and that is stored by the storage unit 307, about the area in which sensing information can be acquired may be defined by a function indicating an outline of the area thereof. If the information in the first data table TBL1 about the area in which sensing information can be acquired is a function, the outline of the area thereof may be divided into a plurality of sections, and the outline of the area may be defined by a plurality of functions that represent each of the sections.

Furthermore, the storage unit 307 stores a second data table TBL2 as shown in FIG. 5. The second data table TBL2 shows a correspondence relationship between each of the second sensing devices 20 and the position in which each of the second sensing devices 20 is provided (as coordinates with respect to an origin O).

The storage unit 308 stores various pieces of information necessary for the processing performed by the authentication device 30b.

For example, the storage unit 308 stores a third data table TBL3 as shown in FIG. 6. The third data table TBL3 shows a correspondence relationship between each of the authentication targets A to L and the sensing information about each of the authentication targets A to L.

Next, the processing of the authentication system 1 according to the first exemplary embodiment of the present invention will be described.

Figure 7:
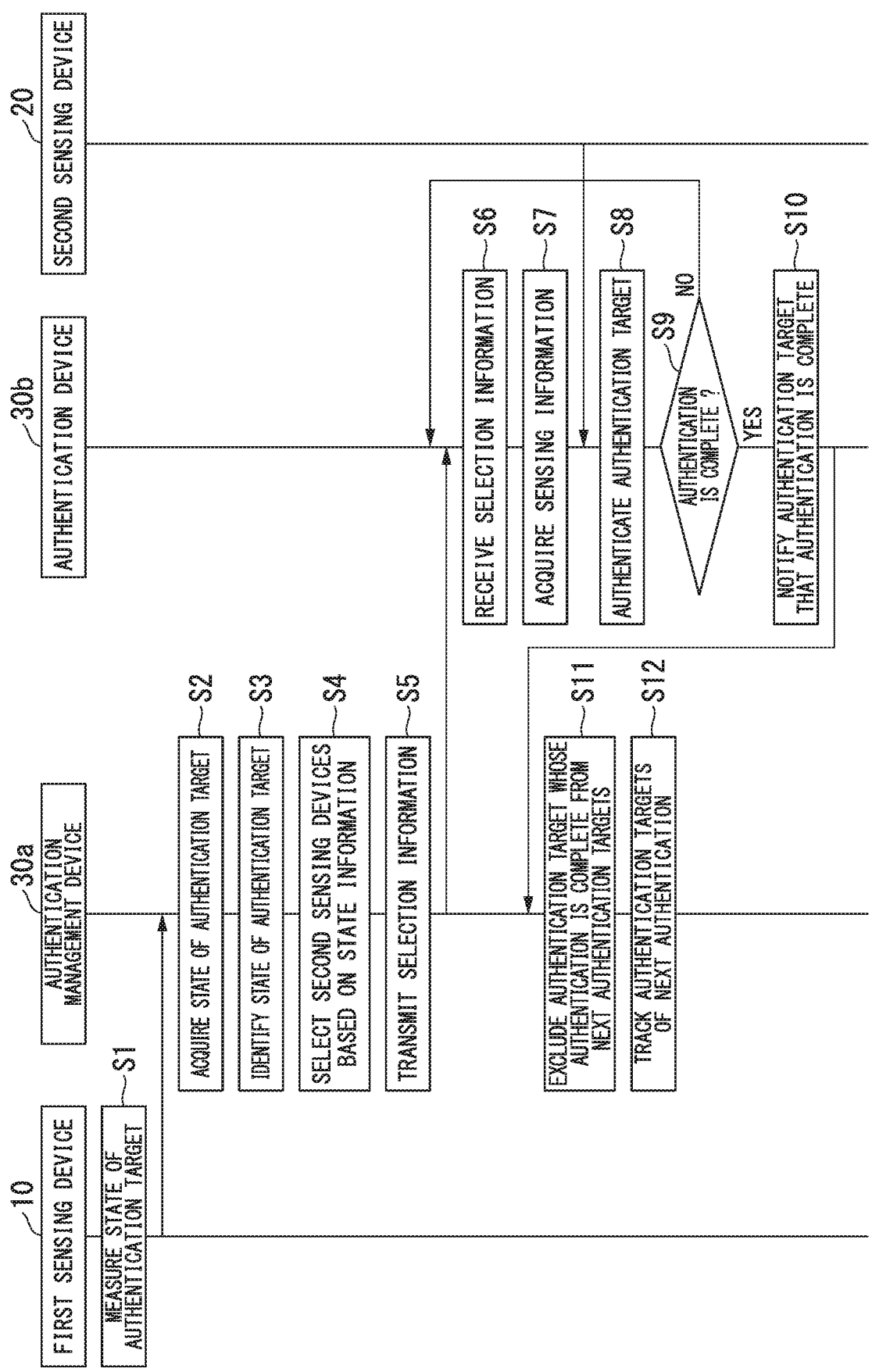
FIG. 7 is a diagram showing the processing flow of the authentication system according to the first exemplary embodiment of the present invention.

Here, the processing flow of the authentication system 1 according to the first exemplary embodiment of the present invention shown in FIG. 7 will be described.

It is assumed that the authentication system 1 has the configuration shown in FIG. 1. It is assumed that the authentication processing device 30 has the configuration shown in FIG. 3. It is assumed that the authentication targets A to L are people. It is assumed that the first sensing device 10 and each of the second sensing devices 20 are imaging devices.

In the authentication system 1, the first sensing device 10 measures the state of each of the authentication targets A to L existing in the predetermined area R (step S1).

Specifically, by imaging the authentication targets A to L in the predetermined area R from above, the first sensing device 10 captures a first image that includes (indicates) the position of each of the authentication targets A to L in the predetermined area R and the direction of the face of each of the authentication targets A to L.

The state identification unit 301 acquires the state of each of the authentication targets A to L existing in the predetermined area R, from the first sensing device 10 (step S2).

For example, the state identification unit 301 acquires the first image from the first sensing device 10. The first image includes (information indicating) the position of each of the authentication targets A to L in the predetermined area R and the direction of the face of each of the authentication targets A to L.

The state identification unit 301 identifies the acquired state of each of the authentication targets A to L (step S3).

For example, the state identification unit 301 analyzes the acquired first image using a technique described in PCT International Publication No. WO 2015/186519. The state identification unit 301 identifies the position of each of the authentication targets A to L in the predetermined area R and the direction of the face of each of the authentication targets by analyzing the first image.

The state identification unit 301 transmits state information indicating the identified state of each of the authentication targets A to L to the second sensing device selection unit 302.

The second sensing device selection unit 302 receives the state information from the state identification unit 301.

The second sensing device selection unit 302 selects the second sensing device 20 based on the received state information (step S4).

As a specific example, a case where the second sensing device selection unit 302 selects a second sensing device 20 with respect to the authentication target F will be described.

It is assumed that the position of the authentication target F in the predetermined area R identified by the state identification unit 301 is indicated by "(X,Y)=(x1,y1)", which are coordinates in an X-axis direction and a Y-axis direction with respect to the origin O shown in FIG. 2. Furthermore, it is assumed that the face of the authentication target F is facing in the direction of arrow W.

The second sensing device selection unit 302 reads the first data table TBL1 from the storage unit 307. The first data table TBL1 shows a correspondence relationship between each of the second sensing devices 20 and the area in which each of the second sensing devices 20 are capable of acquiring sensing information.

The second sensing device selection unit 302 compares the positions of the authentication targets existing in the predetermined R which is included in the state indicated by the acquired state information, and each of the sensing information acquirable areas in the first data table TBL1. As a result of the comparison, the second sensing device selection unit 302 identifies, with respect to each of the authentication targets, the sensing information acquirable areas that include the position of the authentication target.

The second sensing device selection unit 302 identifies the second sensing devices 20 that correspond to the identified sensing information acquirable areas.

The second sensing device selection unit 302 selects a second sensing device 20 from the identified second sensing devices 20, based on the direction of the face of the authentication target, which is included in the state indicated by the acquired state information. For example, the second sensing device selection unit 302 reads the second data table TBL2 shown in FIG. 5 from the storage unit 307. The second sensing device selection unit 302 calculates the angles formed between a vector representing the direction of the face of the authentication target and vectors from the authentication target toward each of the second sensing devices 20. The second sensing device selection unit 302 selects the second sensing device 20 corresponding to the vector that forms the smallest angle.

The second sensing device selection unit 302 transmits selection information indicating the selected second sensing device 20 to the authentication unit 303 (step S5).

The authentication unit 303 receives the selection information from the second sensing device selection unit 302 (step S6).

The authentication unit 303 acquires the sensing information from the second sensing device 20 indicated by the received selection information (step S7).

The authentication unit 303 authenticates the authentication target using the acquired sensing information (step S8).

For example, the authentication unit 303 reads the third data table TBL3 shown in FIG. 6 from the storage unit 308. The authentication unit 303 sequentially compares the acquired sensing information with the sensing information indicated in the third data table TBL3. The authentication unit 303 determines whether or not the acquired sensing information matches the sensing information indicated in the third data table TBL3.

The authentication completion determination unit 304 determines whether or not authentication of the authentication target is complete (step S9).

For example, if the sensing information acquired by the authentication unit 303 matches the sensing information indicated in the third data table TBL3, the authentication completion determination unit 304 determines that authentication of the authentication target corresponding to the sensing information indicated in the third data table TBL3 determined as being matched, is complete. If the authentication unit 303 determines that the acquired sensing information does not match the sensing information shown in the third data table TBL3, the authentication completion determination unit 304 determines that authentication of the authentication target is not complete.

If the authentication completion determination unit 304 determines that authentication of the authentication target is not complete (NO in step S9), the process returns to the processing of step S6.

If the authentication completion determination unit 304 determines that authentication of the authentication target is complete (YES in step S9), it notifies the authentication target exclusion unit 305 of the authentication target determined to have complete authentication (step S10).

The authentication target exclusion unit 305 excludes the target, in which the authentication completion determination unit 304 has determined that authentication is complete, from the authentication targets of the next authentication processing (step S11).

For example, the authentication completion determination unit 304 identifies from the second image the position of the authentication target in the predetermined area R, which corresponds to the sensing information determined by the authentication unit 303 to be matching the sensing information shown in the third data table TBL3, using a technique described in PCT International Publication No. WO 2014/083910. The authentication completion determination unit 304 determines that authentication of the authentication target existing in the position identified from the first image, which corresponds to the position in the predetermined area R identified from the second image, is complete. The authentication completion determination unit 304 notifies the authentication target exclusion unit 305 of the authentication target in which authentication is determined to be complete. The authentication target exclusion unit 305 excludes the target existing in the position identified from the first image, which corresponds to the position in the predetermined R identified from the second image, from the authentication targets of the next authentication processing.

For example, the authentication target tracking unit 306 tracks the targets of the next authentication processing using a technique described in PCT International Publication No. WO 2014/083910 (step S12).

The authentication system 1 repeats the processing of steps S1 to S12.

The processing flow of the authentication system 1 according to the first exemplary embodiment of the present invention has been described above.

The authentication system 1 according to the first exemplary embodiment of the present invention mentioned above includes the first sensing device 10, the second sensing devices 20, and the authentication processing device 30. The first sensing device 10 is provided in a position that enables an overhead view of the authentication targets A to L in the predetermined area R. The first sensing device 10 measures the state of one or more authentication targets existing in the predetermined area R. The second sensing devices 20 are provided at the periphery of the predetermined area R in positions that enable sensing information about an authentication target existing in the predetermined area R to be acquired. One or more second sensing devices 20 are selected from among all of the second sensing devices 20 based on the state of the authentication target acquired by the first sensing device 10. The selected second sensing device 20 acquires sensing information about one or more authentication targets existing in the predetermined area R. The authentication processing device 30 includes the state identification unit 301, the second sensing device selection unit 302, the authentication unit 303, the authentication completion determination unit 304, the authentication target exclusion unit 305, the authentication target tracking unit 306, and the storage unit 307. The state identification unit 301 identifies the state of each of the authentication targets measured by the first sensing device 10. The second sensing device selection unit 302 selects the second sensing device 20 based on the state of each of the authentication targets identified by the state identification unit 301. The second sensing device selection unit 302 selects the second sensing device 20 based on the state of a target in which authentication processing is not complete after the authentication target exclusion unit 305 mentioned below has excluded the authentication targets in which authentication is determined to be complete. The authentication unit 303 performs authentication processing using the sensing information about each of the authentication targets acquired by the selected second sensing device 20. The authentication completion determination unit 304 determines whether or not authentication of an authentication target is complete. The authentication target exclusion unit 305 excludes a target in which authentication is determined to be complete, from the targets of the next authentication processing. The authentication target tracking unit 306 tracks an authentication target. The storage unit 307 stores various pieces of information necessary for the processing performed by the authentication management device 30.

In this manner, the authentication system 1 is capable of rapidly authenticating an authentication target existing in a predetermined area.

Second Exemplary Embodiment

The configuration of an authentication system 1 according to a second exemplary embodiment of the present invention will be described.

Figure 8:
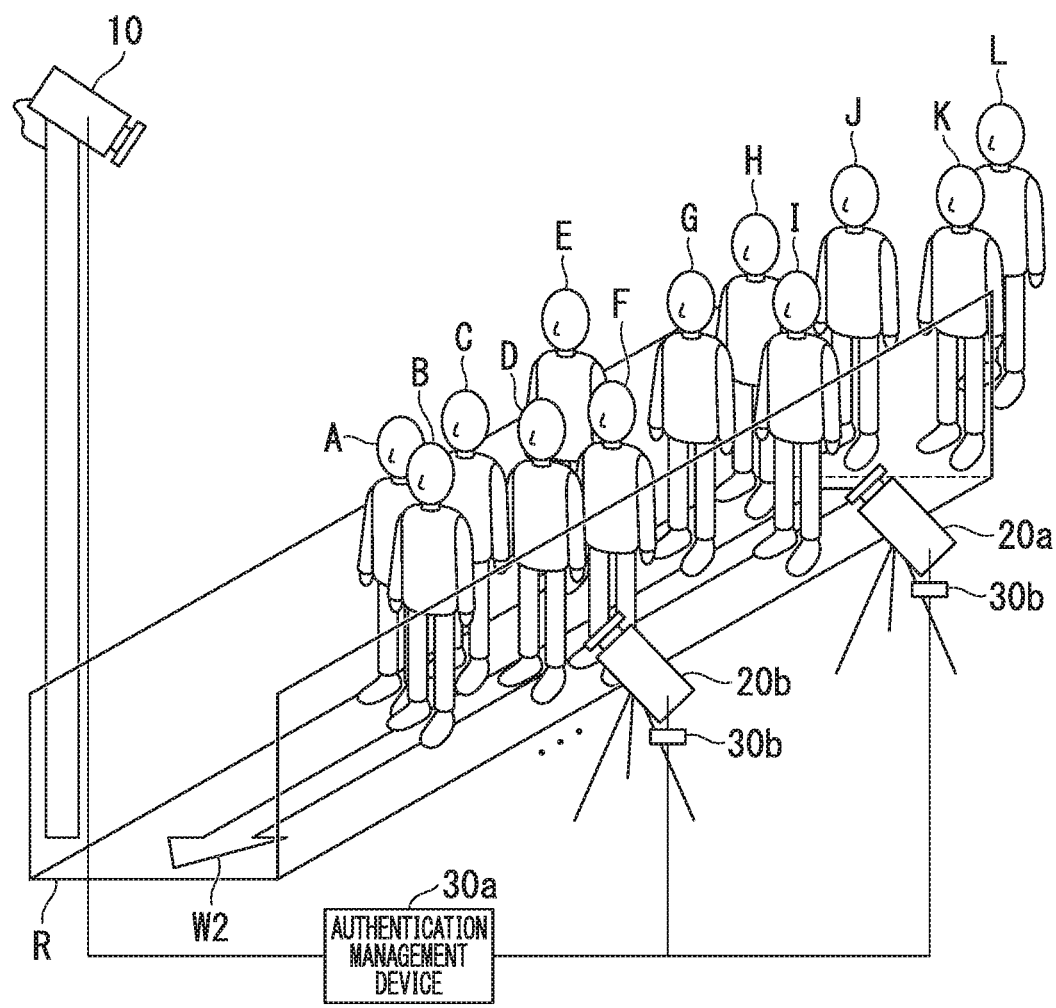
FIG. 8 is a diagram showing the configuration of an authentication system according to a second exemplary embodiment of the present invention.

As shown in FIG. 8, the authentication system 1 according to the second exemplary embodiment of the present invention includes a first sensing device 10, second sensing devices 20a and 20b, and an authentication processing device 30.

The second sensing devices 20a and 20b are collectively referred to as second sensing devices 20.

Furthermore, a predetermined area R is shown in FIG. 8.

As shown in FIG. 8, the first sensing device 10 is provided in a position that enables an overhead view of authentication targets A to L in the predetermined area R.

The first sensing device 10 measures the state of one or more authentication targets existing in the predetermined area R.

The second sensing device 20a is provided with respect to the predetermined area R shown in FIG. 8 on the left rear side in the movement direction of the authentication targets A to L indicated by arrow W2. The second sensing device 20b is provided with respect to the predetermined R shown in FIG. 8 in a position forward of the second sensing device 20a on the left side in the movement direction of the authentication targets A to L indicated by arrow W2, such that it is separated from the second sensing device 20a.

The authentication processing device 30 according to the second exemplary embodiment of the present invention includes, in the same manner as the authentication processing device 30 according to the first exemplary embodiment of the present invention, an authentication management device 30a, and an authentication device 30b.

The second sensing device selection unit 302 according to the second exemplary embodiment of the present invention selects the second sensing devices 20 in a predetermined order.

Next, the processing of the authentication system 1 according to the second exemplary embodiment of the present invention will be described.

Figure 9:
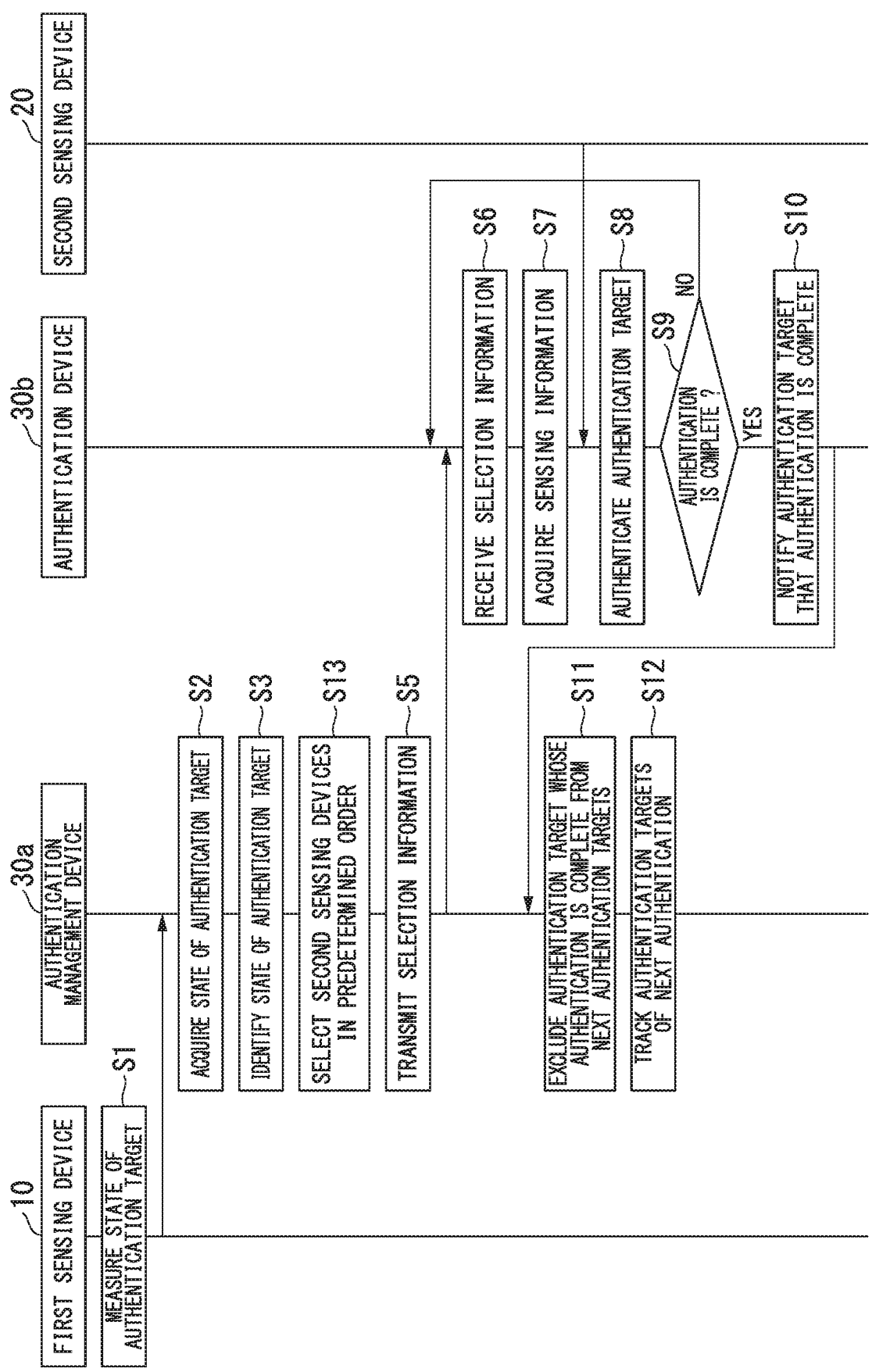
FIG. 9 is a diagram showing the processing flow of the authentication system according to the second exemplary embodiment of the present invention.

Here, the processing flow of the authentication system 1 according to the second exemplary embodiment of the present invention shown in FIG. 9 will be described.

It is assumed that the authentication system 1 has the configuration shown in FIG. 8. It is assumed that the authentication processing device 30 has the configuration shown in FIG. 3. It is assumed that the authentication targets A to L are people. It is assumed that the first sensing device 10 and each of the second sensing devices 20 are imaging devices.

The authentication system 1 performs the processing of steps S1 to S3.

The second sensing device selection unit 302 selects the second sensing devices 20 in a predetermined order (step S13).

Specifically, the second sensing device selection unit 302 firstly selects the second sensing device 20a, which is capable of detecting the authentication targets A to L at the earliest time and is provided at the rearmost position with respect to the movement direction of the authentication targets A to L. Next, when the processing of step S13 has been performed, the second sensing device selection unit 302 further selects the second sensing device 20b, which is capable of detecting the authentication targets A to L at the next earliest time after the second sensing device 20a, and is provided one position forward of the second sensing device 20a. In the same manner, each time the processing of step S13 is performed, the second sensing device 20 provided one position forward is further selected.

The authentication system 1 performs the processing of steps S5 to S12.

The second sensing devices 20 that no longer detect the authentication targets A to L as a result of the authentication targets A to L advancing in the movement direction may be stopped.

The processing flow of the authentication system 1 according to the second exemplary embodiment of the present invention has been described above.

The authentication system 1 according to the second exemplary embodiment of the present invention mentioned above includes the first sensing device 10, the second sensing devices 20, and the authentication processing device 30. The second sensing device selection unit 302 selects the second sensing devices 20 in a predetermined order.

In this manner, the authentication system 1 is capable of operating only the second sensing devices necessary for authentication, thereby reducing energy consumption. Furthermore, the authentication system 1 can rapidly authenticate an authentication target existing in a predetermined area.

Third Exemplary Embodiment

The configuration of an authentication system 1 according to a third exemplary embodiment of the present invention will be described.

Figure 10:
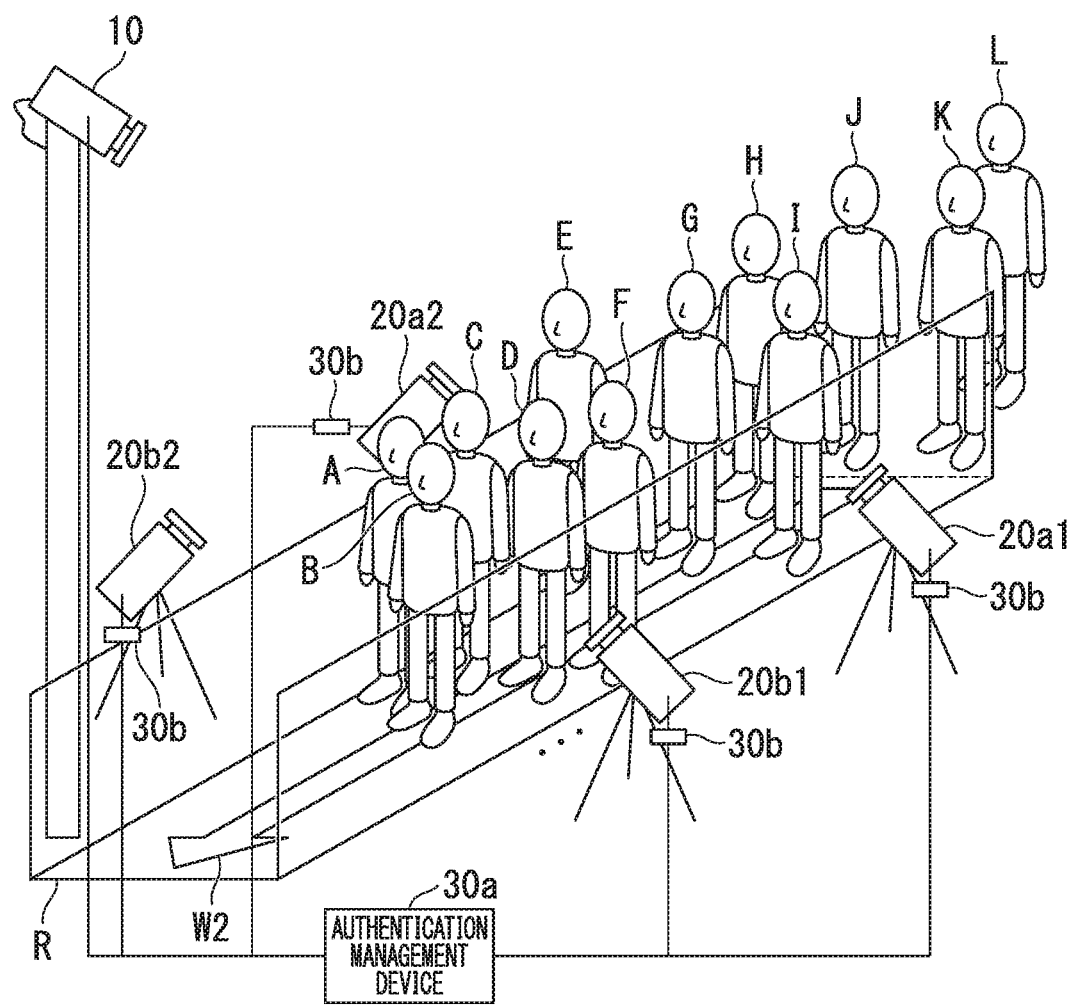
FIG. 10 is a diagram showing the configuration of an authentication system according to a third exemplary embodiment of the present invention.

As shown in FIG. 10, the authentication system 1 according to the third exemplary embodiment of the present invention includes a first sensing device 10, second sensing devices 20a1, 20a2, 20b1 and 20b2, and an authentication processing device 30.

The second sensing devices 20a1 to 20b2 are collectively referred to as second sensing devices 20.

Furthermore, a predetermined area R is shown in FIG. 10.

As shown in FIG. 10, the first sensing device 10 is provided in a position that enables an overhead view of authentication targets A to L in the predetermined area R.

The first sensing device 10 measures the state of one or more authentication targets existing in the predetermined area R.

The second sensing device 20a1 is provided with respect to the predetermined area R shown in FIG. 10 on the left rear side in the movement direction of the authentication targets A to L indicated by arrow W2. The second sensing device 20a2 is provided with respect to the predetermined area R shown in FIG. 10 on the right rear side in the movement direction of the authentication targets A to L. The second sensing device 20b1 is provided with respect to the predetermined area R shown in FIG. 10 on the left front side in the movement direction of the authentication targets A to L. The second sensing device 20b2 is provided with respect to the predetermined area R shown in FIG. 10 on the right front side in the movement direction of the authentication targets A to L.

Figure 11:
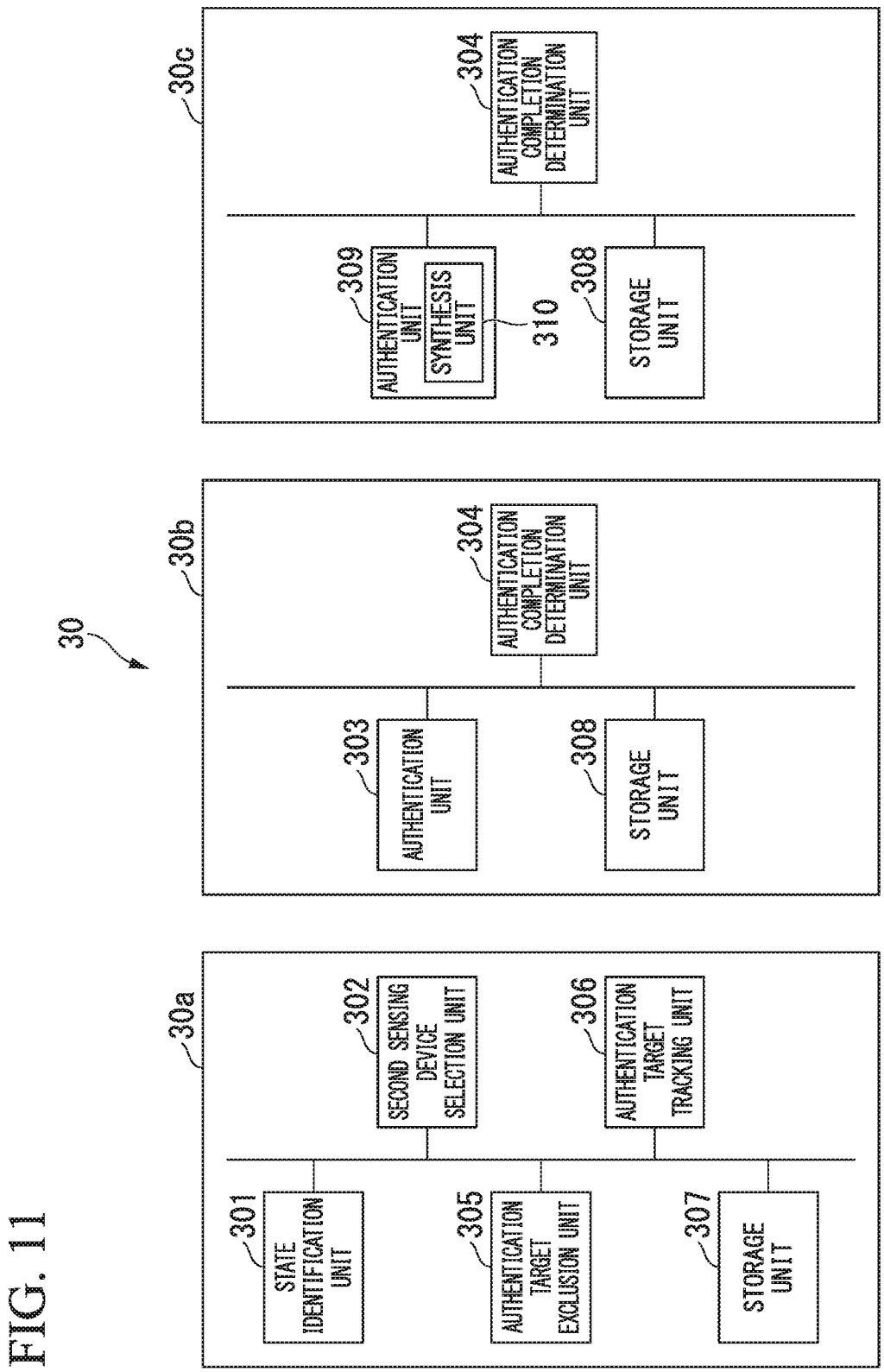
FIG. 11 is a diagram showing the configuration of an authentication processing device according to the third exemplary embodiment of the present invention.

As shown in FIG. 11, the authentication processing device 30 according to the third exemplary embodiment of the present invention includes an authentication management device 30a, an authentication device 30b, and a synthesis authentication device 30c.

The second sensing device selection unit 302 according to the third exemplary embodiment of the present invention selects the second sensing devices 20 in a predetermined order.

The synthesis authentication device 30c includes an authentication completion determination unit 304, a storage unit 308, and an authentication unit 309.

The authentication unit 309 includes a synthesis unit 310.

The synthesis unit 310 synthesizes sensing information with respect to a single authentication target obtained from the plurality of selected second sensing devices 20.

The authentication unit 309 authenticates an authentication target based on the sensing information synthesized by the synthesis unit 310.

Next, the processing of the authentication system 1 according to the third exemplary embodiment of the present invention will be described.

Figure 12:
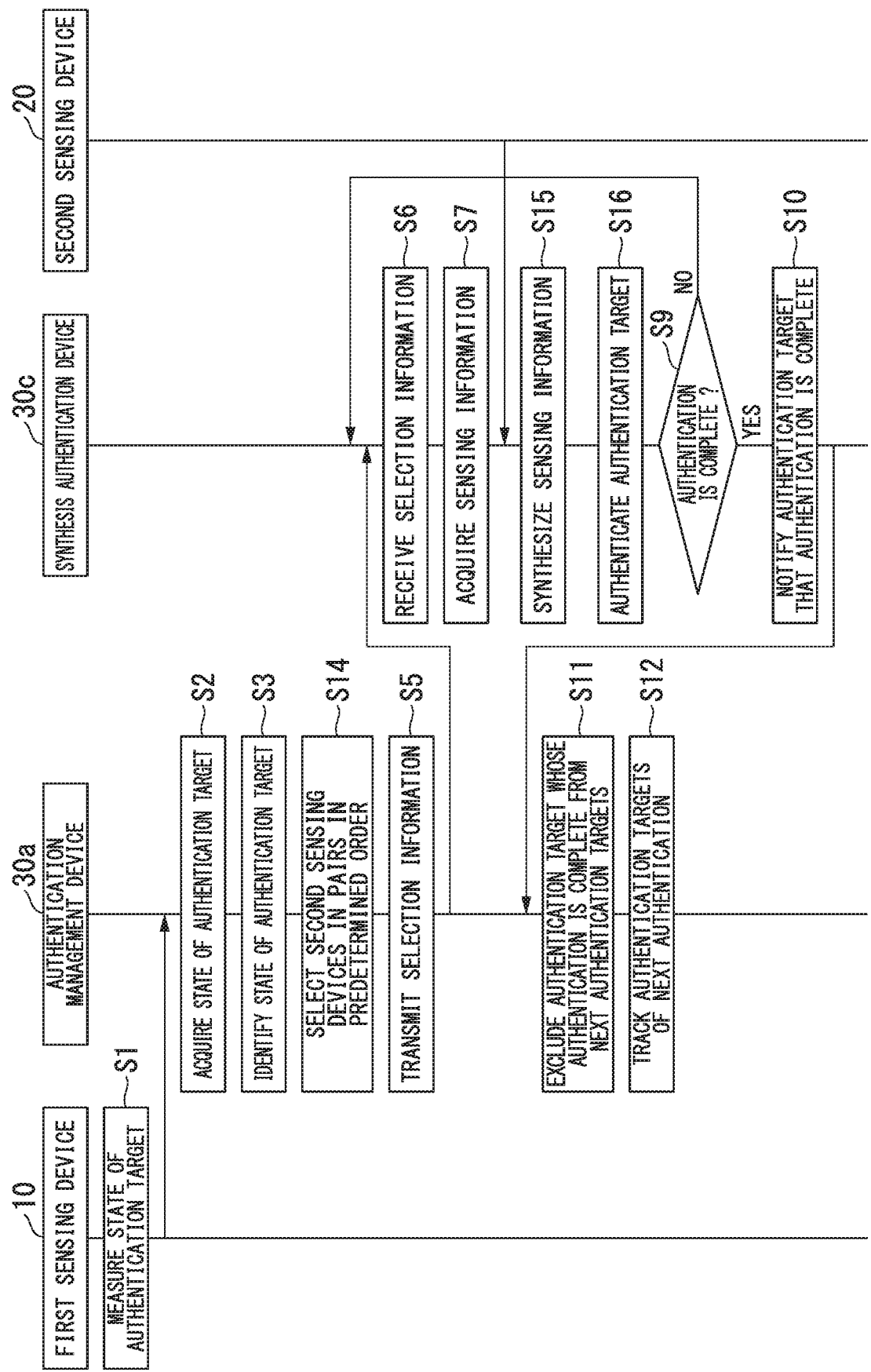
FIG. 12 is a diagram showing the processing flow of the authentication system according to the third exemplary embodiment of the present invention.

Here, the processing flow of the authentication system 1 according to the third exemplary embodiment of the present invention shown in FIG. 12 will be described.

It is assumed that the authentication system 1 has the configuration shown in FIG. 10. It is assumed that the authentication processing device 30 has the configuration shown in FIG. 11. It is assumed that the authentication targets A to L are people. It is assumed that the first sensing device 10 and each of the second sensing devices 20 are imaging devices.

The authentication system 1 performs the processing of steps S1 to S3.

The second sensing device selection unit 302 selects the second sensing devices 20 in pairs in a predetermined order (step S14).

Specifically, the second sensing device selection unit 302 firstly selects the second sensing device 20a1 and the second sensing device 20a2, which are capable of detecting the authentication targets A to L at the earliest time and are provided at the rearmost position with respect to the movement direction of the authentication targets A to L. Next, when the processing of step S14 has been performed, the second sensing device selection unit 302 further selects the second sensing device 20b1 and the second sensing device 20b2, which are capable of detecting the authentication targets A to L at the next earliest time after the second sensing device 20a1 and the second sensing device 20a2, and are provided one position forward of the second sensing device 20a1 and the second sensing device 20a2. In the same manner, each time the processing of step S14 is performed, the second sensing devices 20 provided one position forward are further selected in pairs.

The authentication system 1 performs the processing of steps S5 to S7.

The synthesis unit 310 synthesizes the sensing information with respect to a single authentication target obtained from the plurality of selected second sensing devices 20 (step S15).

The authentication unit 309 authenticates an authentication target based on the sensing information synthesized by the synthesis unit 310 (step S16).

The authentication system 1 performs the processing of steps S9 to S12.

However, the synthesis authentication device 30c performs the processing of steps S6 to S7, steps S15 to S16, and steps S9 to S10.

The authentication device 30b according to the third exemplary embodiment of the present invention may authenticate an authentication target in the same manner as the authentication device 30b according to the second exemplary embodiment of the present invention, and authenticate the authentication target by synthesizing sensing information when authentication is not complete.

The second sensing devices 20 that no longer detect the authentication targets A to L as a result of the authentication targets A to L advancing in the movement direction may be stopped.

The processing flow of the authentication system 1 according to the third exemplary embodiment of the present invention has been described above.

The authentication system 1 according to the third exemplary embodiment of the present invention mentioned above includes the first sensing device 10, the second sensing devices 20, and the authentication processing device 30. The authentication processing device 30 includes the authentication management device 30a, the authentication device 30b, and the synthesis authentication device 30c. The second sensing device selection unit 302 according to the third exemplary embodiment of the present invention selects the second sensing devices 20 in a predetermined order. The synthesis authentication device 30c includes the authentication completion determination unit 304, the storage unit 308, and the authentication unit 309. The authentication unit 309 includes the synthesis unit 310. The synthesis unit 310 synthesizes the sensing information with respect to a single authentication target obtained from the plurality of selected second sensing devices 20. The authentication unit 309 authenticates an authentication target based on the sensing information synthesized by the synthesis unit 310.

In this manner, the authentication system 1 is capable of operating only the second sensing devices necessary for authentication, thereby reducing energy consumption. Furthermore, the authentication system 1 can more rapidly authenticate an authentication target existing in a predetermined area by performing authentication by synthesizing sensing information obtained from both the left and right sides of each of the authentication targets A to L.

Fourth Exemplary Embodiment

The configuration of an authentication system 1 according to a fourth exemplary embodiment of the present invention will be described.

The authentication system 1 according to the fourth exemplary embodiment of the present invention includes, in the same manner as the authentication system 1 according to the first exemplary embodiment of the present invention, a first sensing device 10, second sensing devices 20a and 20b, and an authentication processing device 30.

Figure 13:
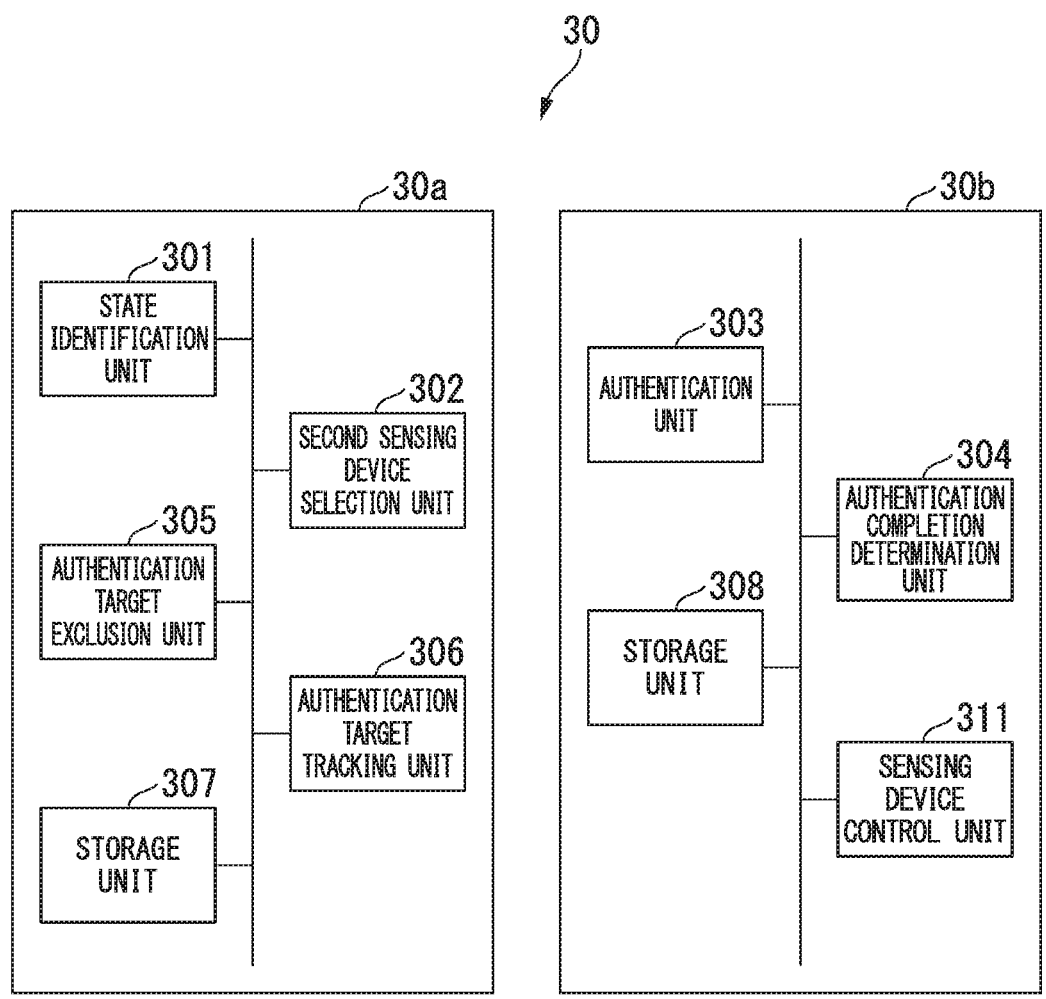
FIG. 13 is a diagram showing the configuration of an authentication processing device according to a fourth exemplary embodiment of the present invention.

As shown in FIG. 13, the authentication device 30b includes an authentication unit 303, an authentication completion determination unit 304, a storage unit 308, and a sensing device control unit 311.

The sensing device control unit 311 controls the functions of the second sensing devices 20.

Specifically, if the second sensing devices 20 are imaging devices, the sensing device control unit 311 changes the direction, the angle of view, and the like of the second sensing devices 20. Furthermore, when a mirror is provided and the second sensing devices 20 image an authentication target reflected by the mirror, the sensing device control unit 311 changes the direction of the mirror. In the fourth exemplary embodiment of the present invention, if the second sensing devices 20 image an authentication target reflected in the mirror, changing the direction of the mirror is a part of the function of the second sensing devices 20.

Next, the processing of the authentication system 1 according to the fourth exemplary embodiment of the present invention will be described.

Figure 14:
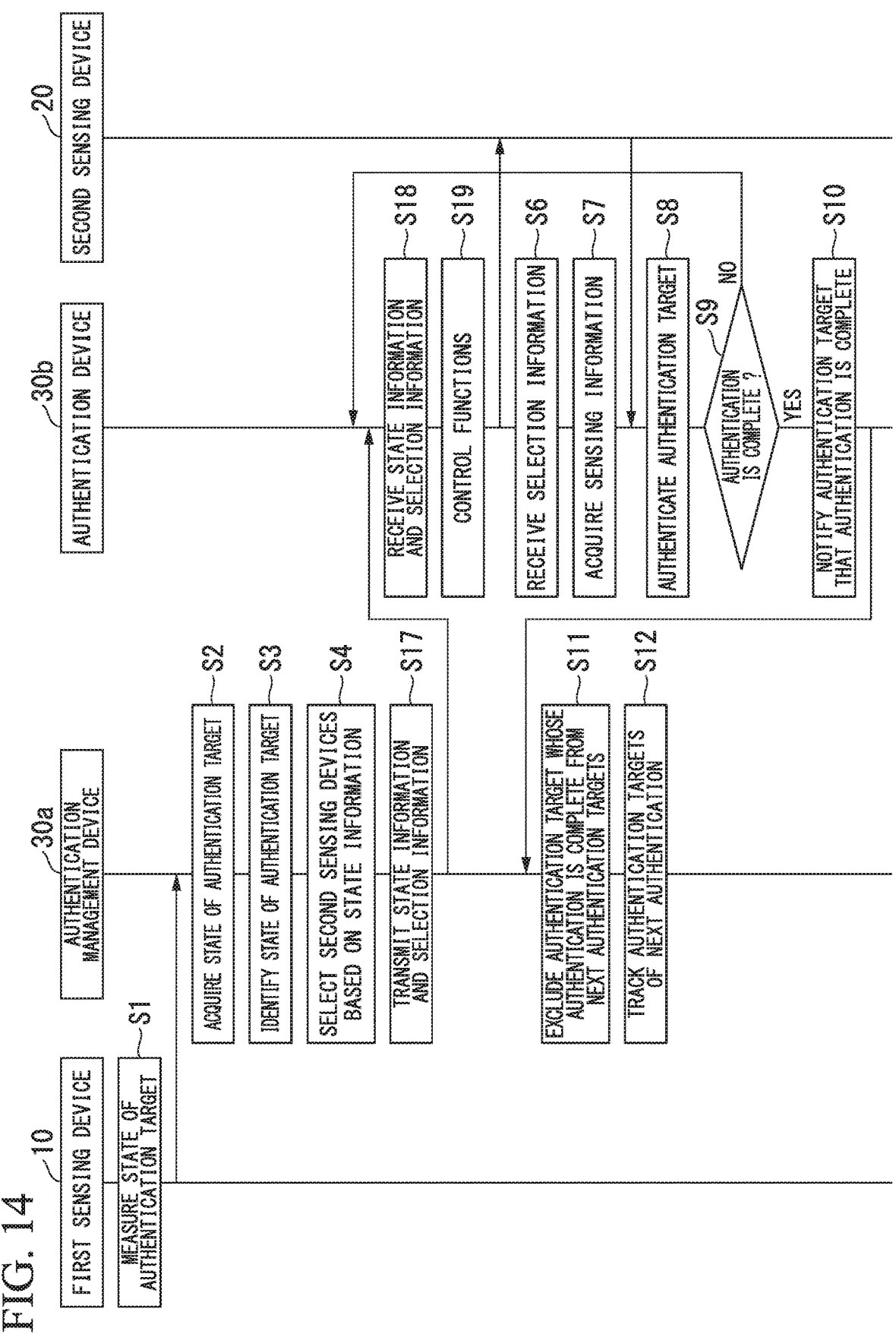
FIG. 14 is a diagram showing the processing flow of an authentication system according to the fourth exemplary embodiment of the present invention.

Here, the processing flow of the authentication system 1 according to the fourth exemplary embodiment of the present invention shown in FIG. 14 will be described.

It is assumed that the authentication system 1 has the configuration shown in FIG. 1. It is assumed that the authentication processing device 30 has the configuration shown in FIG. 13. It is assumed that the authentication targets A to L are people. It is assumed that the first sensing device 10 and each of the second sensing devices 20 are imaging devices.

The authentication system 1 performs the processing of steps S1 to S4.

The second sensing device selection unit 302 transmits selection information indicating the selected second sensing devices 20 and state information, to the authentication device 30b (step S17).

The sensing device control unit 311 receives the selection information and the state information from the second sensing device selection unit 302 (step S18).

The sensing device control unit 311 controls the functions of the second sensing devices based on the selection information and the state information (step S19).

Specifically, the sensing device control unit 311 changes the angle and the angle of view of the second sensing devices 20 indicated by the selection information, so as to give an angle and angle of view for imaging the face of the authentication target included in the state indicated by the state information, as much as possible from the front.

The authentication system 1 performs the processing of steps S6 to S12.

The processing flow of the authentication system 1 according to the fourth exemplary embodiment of the present invention has been described above.

The authentication system 1 according to the fourth exemplary embodiment of the present invention mentioned above includes the first sensing device 10, the second sensing devices 20, and the authentication processing device 30. The authentication processing device 30 includes the authentication management device 30a, and the authentication device 30b. The sensing device control unit 311 controls the functions of the second sensing devices 20 based on selection information and state information.

In this manner, the authentication system 1 is capable of acquiring sensing information from the second sensing devices 20 that further improves the accuracy of authentication. The authentication system 1 is capable of rapidly authenticating an authentication target existing in a predetermined area.

Fifth Exemplary Embodiment

The configuration of an authentication system 1 according to a fifth exemplary embodiment of the present invention will be described.

Figure 15:
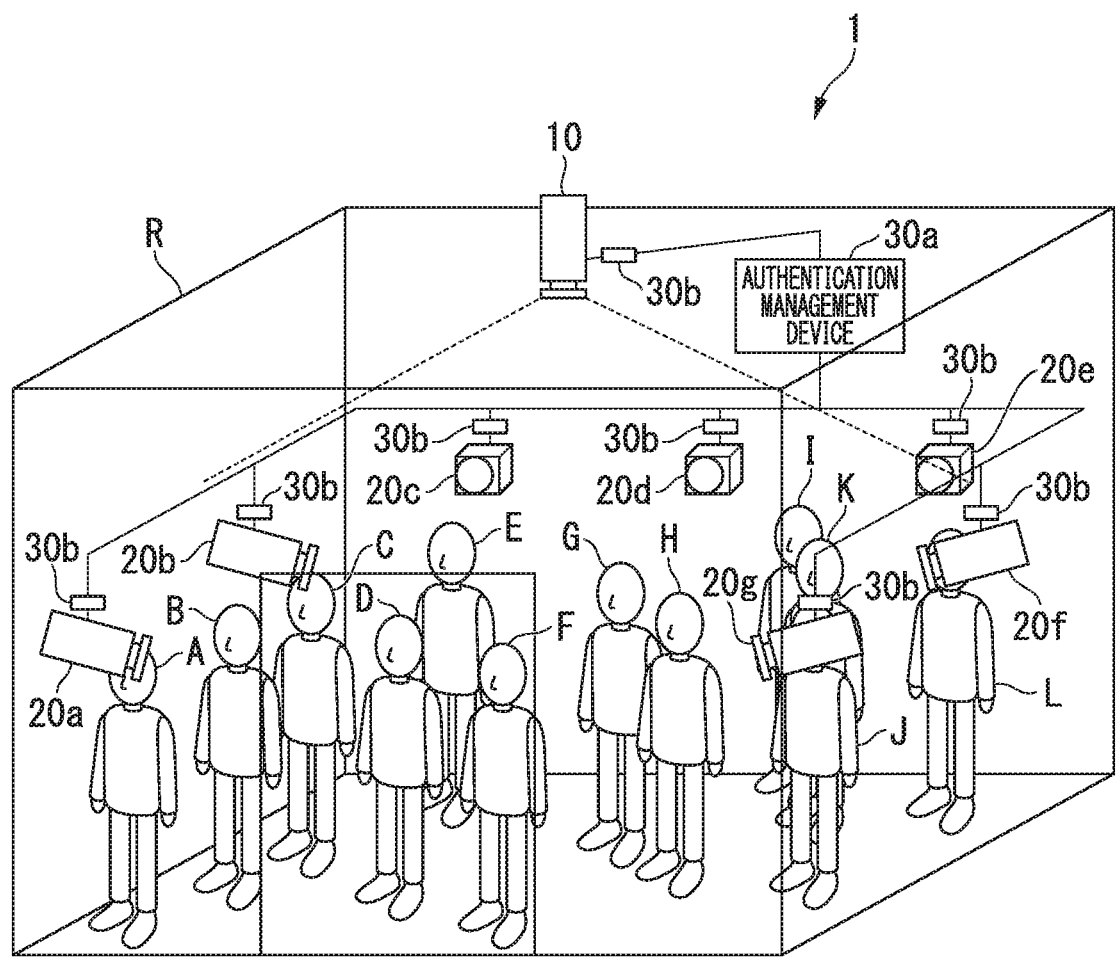
FIG. 15 is a diagram showing the configuration of an authentication system according to a fifth exemplary embodiment of the present invention.

As shown in FIG. 15, the authentication system 1 according to the fifth exemplary embodiment of the present invention includes a first sensing device 10, second sensing devices 20a to 20g, and an authentication processing device 30.

The authentication processing device 30 includes an authentication management device 30a, and an authentication device 30b.

The authentication management device 30a includes a state identification unit 301, a second sensing device selection unit 302, an authentication target exclusion unit 305, an authentication target tracking unit 306, and a storage unit 307.

The authentication device 30b includes an authentication unit 303, an authentication completion determination unit 304, and a storage unit 308. An authentication device 30b is provided in each of the second sensing devices 20. Furthermore, an authentication device 30b is further provided in the first sensing device 10.

The second sensing device selection unit 302 selects the second sensing devices 20 based on the state of each of the authentication targets identified by the state identification unit 301. Furthermore, the second sensing device selection unit 302 may select the first sensing device 10 instead of the second sensing devices when an authentication target identified by the state identification unit 301 is facing the first sensing device 10.

The processing flow of the authentication system 1 according to the fifth exemplary embodiment of the present invention has been described above.

The authentication system 1 according to the fifth exemplary embodiment of the present invention mentioned above includes the first sensing device 10, the second sensing devices 20, and the authentication processing device 30. The authentication processing device 30 includes the authentication management device 30a, and the authentication device 30b. The authentication device 30b is further provided in the first sensing device 10. The second sensing device selection unit 302 selects the first sensing device 10 instead of the second sensing devices 20 when an authentication target identified by the state identification unit 301 is facing the first sensing device 10.

In this manner, the authentication system 1 is capable of acquiring sensing information from the first sensing device 10. The authentication system 1 is capable of more rapidly authenticating an authentication target existing in a predetermined area.

In an exemplary embodiment of the present invention, the positions of each of the authentication targets A to L in the predetermined area R are not limited to positions identified based on the first image captured by the first sensing device 10. The first sensing device 10 is, for example, a sensor that detects the presence of an object as described in Japanese Unexamined Patent Application, First Publication No. 2014-170431, and the position of each of the authentication targets A to L in the predetermined area R may be identified based on the presence of an object in the predetermined area R detected by the first sensing device 10.

In an exemplary embodiment of the present invention, a sensor sheet using a presence sensing technique or the like capable of detecting footprints may be provided on the entire floor of the predetermined area R as the first sensing device 10, wherein the positions where footprints are detected are identified as the position of each of the authentication targets A to L in the predetermined area R, and the direction of the authentication target is identified assuming that the direction of the footprint represents the direction of the face of the authentication target.

In an exemplary embodiment of the present invention, the first sensing device 10 is not limited to a device that detects both the direction of the authentication targets A to L and their positions in the predetermined area R. For example, the first sensing device 10 detects only the position of each of the authentication targets A to L in the predetermined area R. The second sensing device selection unit 302 identifies, based on this comparison, the sensing information acquirable area that includes the position of the authentication target with respect to each of the authentication targets. The second sensing device selection unit 302 identifies the second sensing device 20 that corresponds to the identified sensing information acquirable area. The authentication unit 303 receives selection information that includes all of the identified second sensing devices 20, from the second sensing device selection unit 302. The authentication unit 303 acquires sensing information from all of the second sensing devices 20 indicated by the received selection information in an arbitrary order. The authentication unit 303 completes authentication of the authentication target thereof if the acquired sensing information matches the sensing information indicated in the third data table TBL3. If the acquired sensing information does not match the sensing information indicated in the third data table TBL3, the authentication unit 303 may perform authentication of the authentication target by acquiring sensing information from another second sensing device 20.

The configuration of the information processing system 1 according to an exemplary embodiment of the present invention will be described.

Figure 16:
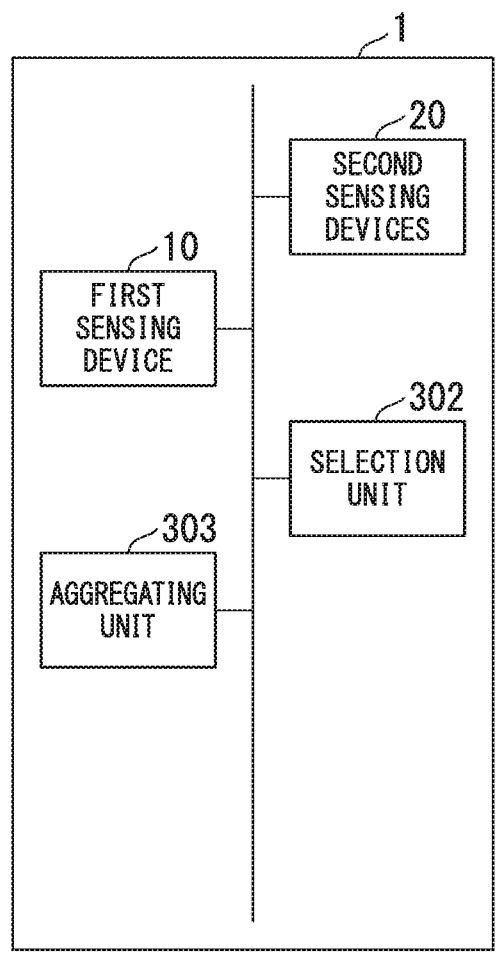
FIG. 16 is a diagram showing the configuration of an authentication system according to an exemplary embodiment of the present invention.

As shown in FIG. 16, the information processing system 1 includes a first detection device 10, second detection devices 20, a selection unit 302, and an aggregating unit 303.

The first detection device 10 acquires information about a first domain.

The second detection devices 20 acquire information about each of the second domains included in the first domain.

The selection unit 302 selects the second detection devices 20 based on the state of the target obtained from the information acquired by the first detection device 10.

The aggregating unit 303 aggregates information from the second detection devices 20 selected by the selection unit 302.

In this manner, the information processing system 1 is capable of rapidly acquiring sensing information about an authentication target existing in a predetermined area. As a result, the information processing system 1 is capable of more rapidly authenticating an authentication target existing in a predetermined area.

A case has been described in which the authentication processing device 30 according to an exemplary embodiment of the present invention included the authentication management device 30a, the authentication device 30b, and the synthesis authentication device 30c. However, the authentication processing device 30 is not limited to a case in which it includes the authentication management device 30a, the authentication device 30b, and the synthesis authentication device 30c. The functional units provided in the authentication processing device 30 according to an exemplary embodiment of the present invention may, within a range where appropriate processing can be performed, be provided in one or more of the authentication management device 30a, the authentication device 30b, the synthesis authentication device 30c, and another device.

The processing flow in an exemplary embodiment of the present invention is such that the order of processing may be changed within a range where appropriate processing can be performed.

In an exemplary embodiment of the present invention, the authentication unit 303 reads from the storage unit 308, information indicating the correspondence relationship between the appearance position of the authentication target in the first image captured by the first sensing device 10 and the appearance position of the authentication target in the second image captured by the second sensing devices 20. The authentication unit 303 identifies the position in which the authentication target identified in the first image acquired from the first sensing device 10 appears in the second image acquired from the second sensing device 20, based on the correspondence relationship that has been read. For example, the authentication unit 303 identifies the position in which the authentication target F shown in FIG. 2, which was identified in the first image acquired from the first sensing device 10, appears on the left side in the second image acquired from the second sensing device 20g. The authentication unit 303 authenticates the authentication target that appears at the position on the left side in the second image. The authentication unit 303 may perform authentication of the authentication target in this manner.

The storage units 307 and 308, and the other storage units in an exemplary embodiment of the present invention may each be provided anywhere within a range where appropriate transmission and reception of information can be performed. Furthermore, a plurality of storage units 307 and 308 and other storage units may exist and dispersively store the data within a range where appropriate transmission and reception of information can be performed.

Exemplary embodiments of the present invention have been described. The authentication management device 30a, the authentication device 30b, the synthesis authentication device 30c, and the authentication processing device 30 mentioned above may each have an internal computer system. Further, the steps in the processing mentioned above are stored in a computer-readable recording medium in the form of a program, and the processing described above is performed by the computer reading and executing the program. Here, the computer-readable recording medium refers to a magnetic disk, a magneto-optical disk, a CD-ROM, a DVD-ROM, a semiconductor memory, or the like. Furthermore, the computer program may be transmitted to the computer by means of a communication line, and the computer receiving the transmission may execute the program thereof.

Moreover, the program described above may realize a portion of the functions mentioned above. Further, the program described above may be a file that realizes the functions mentioned above by being combined with a program already recorded on the computer system, as a so-called difference file (difference program).

Although several exemplary embodiments of the present invention have been described, the exemplary embodiments are examples and do not limit the scope of the invention. In the exemplary embodiments, additions, various omissions, substitutions, and changes may be made without departing from the gist of the invention.

The exemplary embodiments described above may also be described entirely or in part by the following supplementary notes, without being limited to the following.

(Supplementary Note 1)

An information processing system comprising:

a first detection device that acquires information about a first domain;

a plurality of second detection devices, each of which acquires information about a domain included in the first domain;

a selection unit that selects at least one second detection device from the plurality of second detection devices based on a state of a target obtained from the acquired information about the first domain; and an aggregating unit that aggregates the information about the domain acquired by the selected at least one second detection device.

(Supplementary Note 2)

The information processing system according to supplementary note 1, wherein the state of the target comprises a position and a direction of the target.

(Supplementary Note 3)

The information processing system according to supplementary note 1 or 2, further comprising:

an authentication unit that authenticates the target based on the information acquired by the aggregating unit.

(Supplementary Note 4)

The information processing system according to supplementary note 3, further comprising:

an authentication completion determination unit that determines whether authentication of the target is complete; and an authentication target exclusion unit that excludes a target in which authentication is determined to be complete from targets of a next authentication, wherein the selection unit selects at least one second detection device from the plurality of second detection devices based on a state of a target in which authentication is not complete.

(Supplementary Note 5)

The information processing system according to supplementary note 4, wherein the first detection device and each of the plurality of second detection devices are respectively imaging devices, the information processing system further comprising:

a storage unit that stores information indicating a correspondence relationship between an appearance position of a target in a captured image acquired by the first sensing device and an appearance position of a target in a captured image acquired by one of the plurality of second detection devices, wherein the authentication unit identifies, based on the correspondence relationship, a position in which a target identified in a captured image acquired by the first sensing device appears in a captured image acquired by one of the plurality of second detection devices, and authenticates the identified target.

(Supplementary Note 6)

The information processing system according to any one of supplementary notes 1 to 5, further comprising:

an authentication target tracking unit that tracks the target, wherein the plurality of second detection devices are installed such that they are separated in a movement direction of the target, and the selection unit selects the second detection device based on the tracking result of the target.

(Supplementary Note 7)

The information processing system according to any one of supplementary notes 1 to 6, wherein the selection unit selects a plurality of second detection devices among the plurality of second detection devices with respect to one target based on a state of the target, and the aggregating unit synthesizes information with respect to the one target aggregated from the selected plurality of second detection devices.

(Supplementary Note 8)

The information processing system according to any one of supplementary notes 1 to 7, further comprising:

a control unit that controls a function of the selected at least one second detection device according to a state of the target.

(Supplementary Note 9)

The information processing system according to any one of supplementary notes 1 to 8, wherein the selection unit selects the first detection device.

(Supplementary Note 10)

The information processing system according to any one of supplementary notes 1 to 9, wherein the first detection device is a sensor that acquires information related to a footprint of the target, and the selection unit selects at least one second detection device from the plurality of second detection devices based on the state of the target that includes the footprint of the target.

(Supplementary Note 11)

An information processing method comprising:

acquiring information about a first domain;

selecting, based on a state of a target obtained from the acquired information about the first domain, at least one detection device from a plurality of detection devices, each of which acquires information about a domain included in the first domain; and aggregating the information about the domain acquired by the selected at least one detection device.

(Supplementary Note 12)

A program causes a computer to execute:

acquiring information about a first domain;

selecting, based on a state of a target obtained from the acquired information about the first domain, at least one detection device from a plurality of detection devices, each of which acquires information about a domain included in the first domain; and aggregating the information about the domain acquired by the selected at least one detection device.

INDUSTRIAL APPLICABILITY

The present invention may be applied to an information processing system, an information processing method, and a program.

REFERENCE SYMBOLS

1 Authentication system (information processing system)
10 First sensing device (first detection device)
20, 20a to 20g Second sensing device (second detection device)
30 Authentication processing device
30a Authentication management device
30b Authentication device
30c Synthesis authentication device
301 State identification unit
302 Second sensing device selection unit (selection unit)
303, 309 Authentication unit (aggregating unit)
304 Authentication completion determination unit
305 Authentication target exclusion unit
306 Authentication target tracking unit
307, 308 Storage unit
310 Synthesis unit
311 Sensing device control unit

The invention claimed is:

1. An information processing system comprising:
a first sensor that acquires information about a first domain;
a plurality of second sensors, each of which acquires information about a domain included in the first domain;
a memory storing instructions; and a processor configured to execute the instructions to:
  select at least one second sensor from the plurality of second sensors based on a state of a first target obtained from the acquired information about the first domain;
  aggregate the information about the domain acquired by the selected at least one second sensor;
  authenticate the first target based on the aggregated information;
  determine whether the authentication of the first target is complete;
  exclude the first target from targets of a next authentication when it is determined that the authentication of the first target is complete; and
  select at least one second sensor from the plurality of second sensors based on a state of a target whose authentication is not complete.

2. The information processing system according to claim 1, wherein the state of the first target comprises a position and a direction of the first target.

3. The information processing system according to claim 1,
  wherein the first sensor and each of the plurality of second sensors are respectively imaging devices, the information processing system further comprising:
  a storage that stores information indicating a correspondence relationship between an appearance position of the first target in a captured image acquired by the first sensor and an appearance position of the first target in a captured image acquired by one of the plurality of second sensors,
  wherein the processor is configured to execute the instructions to:
  identify, based on the correspondence relationship, a position in which the first target identified in the captured image acquired by the first sensor appears in the captured image acquired by the one of the plurality of second.

4. The information processing system according to claim 1, wherein the processor is configured to execute the instructions to:
  track the first target,
  wherein the plurality of second sensors are installed such that they are separated in a movement direction of the first target, and
  wherein the processor is configured to execute the instructions to:
  select the second sensor based on the tracking result of the first target.

5. The information processing system according to claim 1, wherein the processor is configured to execute the instructions to:
  control a function of the selected at least one second sensor according to the state of the first target.

6. The information processing system according to claim 1, wherein the processor is configured to execute the instructions to:
  select the first sensor.

7. An information processing system comprising:
  a first sensor that acquires information about a first domain;
  a plurality of second sensors, each of which acquires information about a domain included in the first domain;
  a memory storing instructions; and
  a processor configured to execute the instructions to:
  select a plurality of second sensors among the plurality of second sensors based on a state of one target obtained from the acquired information about the first domain; and
  synthesize information with respect to the one target aggregated from the selected plurality of second sensors.

8. An information processing system comprising:
  a first sensor that acquires information about a first domain, wherein the first sensor is a sensor that acquires information related to a footprint of a target;
  a plurality of second sensors, each of which acquires information about a domain included in the first domain;
  a memory storing instructions; and
  a processor configured to execute the instructions to:
  select at least one second sensor from the plurality of second sensors based on a state of the target that includes the footprint of the target; and
  aggregate the information about the domain acquired by the selected at least one second sensor.

9. An information processing method comprising:
acquiring information about a first domain;
selecting, based on a state of a first target obtained from the acquired information about the first domain, at least one sensor from a plurality of sensors, each of which acquires information about a domain included in the first domain;
aggregating the information about the domain acquired by the selected at least one sensor;
authenticating the first target based on the aggregated information;
determining whether the authentication of the first target is complete;
excluding the first target from targets of a next authentication when it is determined that the authentication of the first target is complete; and
selecting at least one second sensor from the plurality of second sensors based on a state of a target whose authentication is not complete.

* * * * *

UNITED STATES PATENT AND TRADEMARK OFFICE
CERTIFICATE OF CORRECTION

PATENT NO. : 10,796,166 B2
APPLICATION NO. : 16/086794
DATED : October 6, 2020
INVENTOR(S) : Shinichi Anami and Yushi Niwa Page 1 of 1

It is certified that error appears in the above-identified patent and that said Letters Patent is hereby corrected as shown below:

In the Claims

Column 19, Line 38; In Claim 3, delete "second." and insert --second sensors.-- therefor Signed and Sealed this
Fifteenth Day of December, 2020

Andrei Iancu
*Director of the United States Patent and Trademark Office*